United States Patent [19]

Bogner et al.

[11] Patent Number: 5,143,489
[45] Date of Patent: Sep. 1, 1992

[54] METHOD OF DRILLING BORES

[75] Inventors: Werner Bogner, Munich; Rolf Spangenberg, Gauting; Paul Deutschenbaur, Germering, all of Fed. Rep. of Germany

[73] Assignee: Hilti Aktiengesellschaft, Furstentum, Liechtenstein

[21] Appl. No.: 753,031

[22] Filed: Aug. 30, 1991

[30] Foreign Application Priority Data

Sep. 3, 1990 [DE] Fed. Rep. of Germany ....... 4027868
May 6, 1991 [DE] Fed. Rep. of Germany ....... 4114703

[51] Int. Cl.⁵ ............................................. B23B 35/00
[52] U.S. Cl. .................................. 408/1 R; 408/72 B; 408/204
[58] Field of Search ............... 408/1 R, 204, 206, 209, 408/115 R, 115 B, 72 B, 97, 103

[56] References Cited

U.S. PATENT DOCUMENTS

| | | | |
|---|---|---|---|
| 3,308,689 | 3/1967 | Macdonald | 408/204 |
| 4,023,907 | 5/1977 | Clang | 408/115 R |
| 4,500,234 | 2/1985 | Orth et al. | 408/204 |
| 4,978,255 | 12/1990 | Gale et al. | 408/72 B |

FOREIGN PATENT DOCUMENTS

| | | | |
|---|---|---|---|
| 2234825 | 1/1974 | Fed. Rep. of Germany | 408/204 |
| 2941577 | 4/1981 | Fed. Rep. of Germany | 408/72 B |

Primary Examiner—Daniel W. Howell
Attorney, Agent, or Firm—Andeson Kill Olick & Oshinsky

[57] ABSTRACT

In drilling a bore in a structural component (3) using a hollow cylindrical core drill bit (4) initially a guide such as a disk (1) or a template (12) is secured to the surface of a structural component (3) for guiding one of the inner or outer circumferential periphery of the core drill bit. At the commencement of the drilling operation, the core drill bit (4) is guided by the disk or template and maintains the bit in a centered position. The guide can be fixed to the surface of the structural component (3) in a known manner, such as by an adhesive or by fastening elements (2, 6) driven directly into the structural component. Generally core drill bits of smaller diameter can be guided by the outer circumferential periphery of the guide (2) or by the inside circumferential periphery of the template (12).

6 Claims, 2 Drawing Sheets

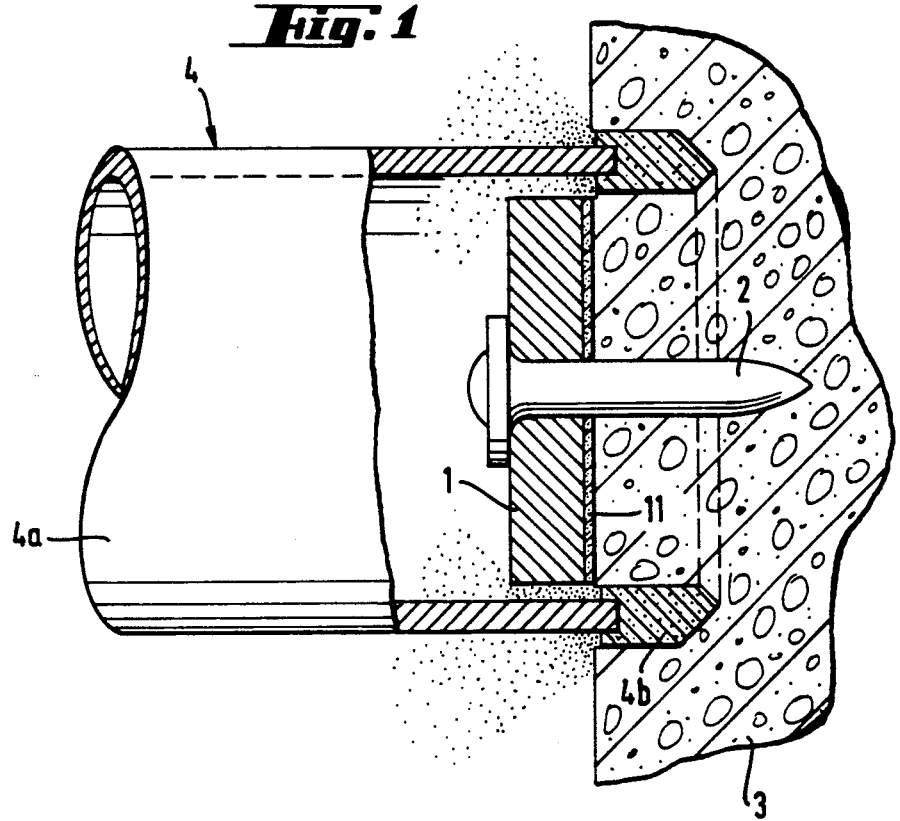
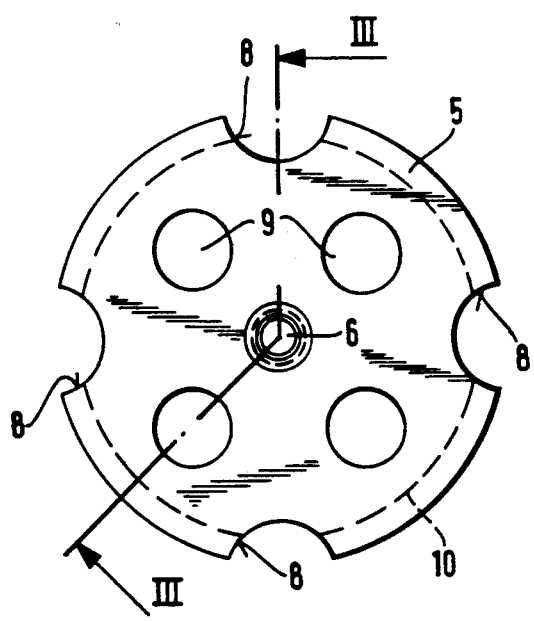 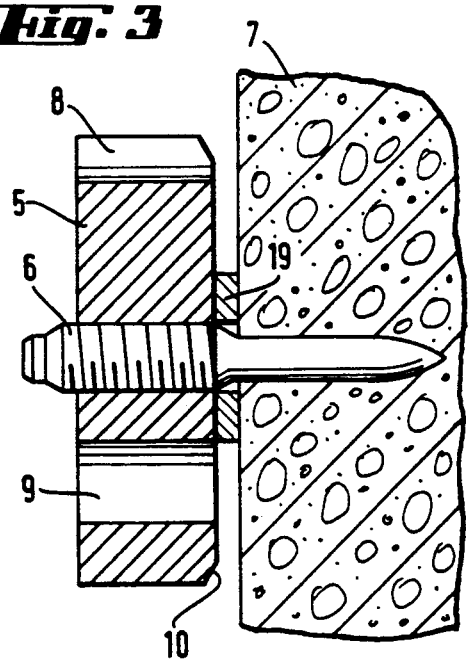

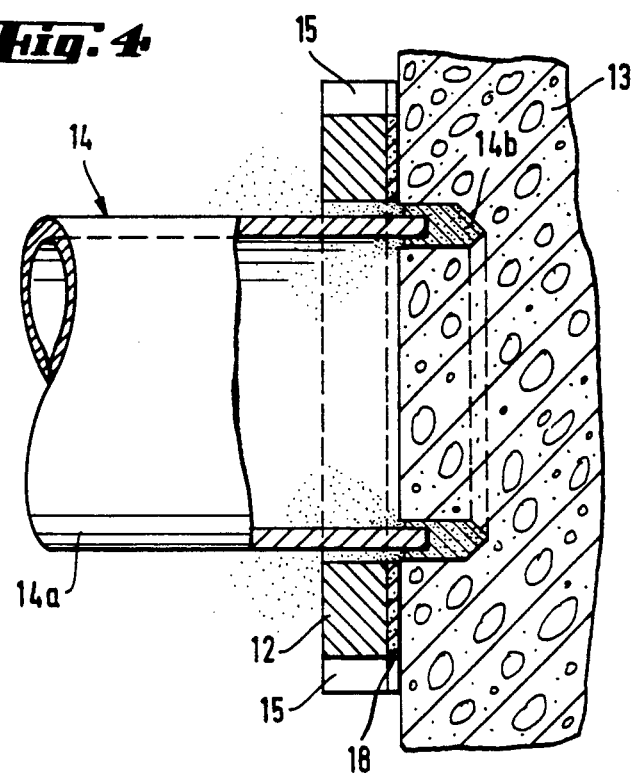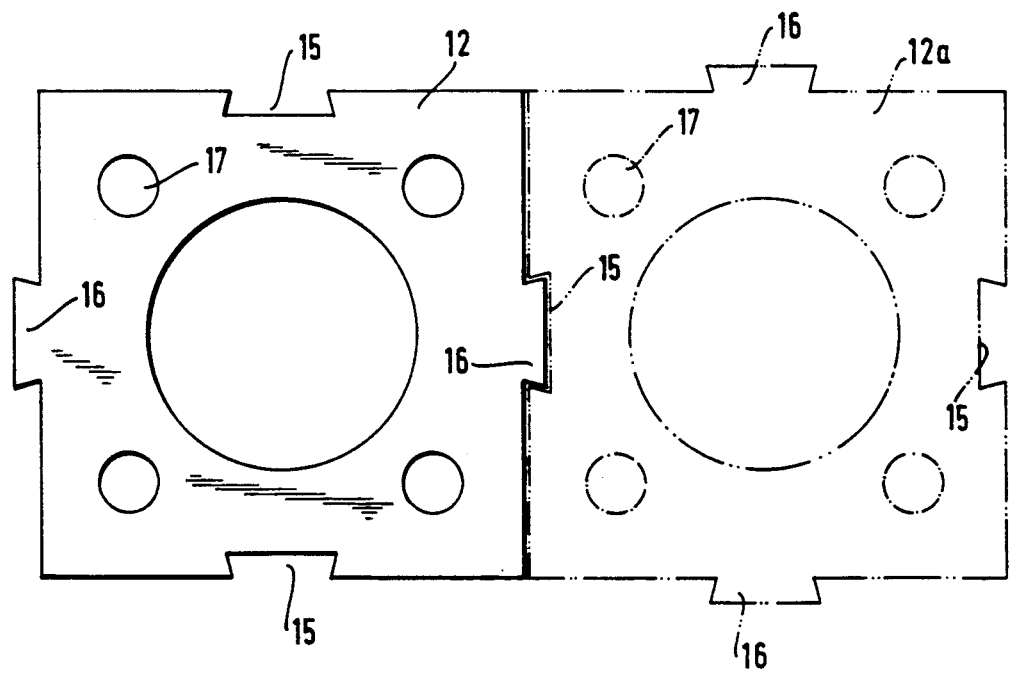

METHOD OF DRILLING BORES

BACKGROUND OF THE INVENTION

The present invention is directed to a method of drilling a bore in a structural component using a hollow cylindrically shaped core drilling tool.

In hand held drilling tools with diamond tip core drill bits, accurately centered spot drilling involves noticeable difficulties depending on the type of material of and the surface of the structural component. Centering by providing a preliminary centering bore using a centering bit is also cumbersome, since the centering bit has to be replaced and extends the time required for the overall drilling procedure. Spot drilling at 45° with the core drill bit being placed in the 90° position during the spot drilling operation, affords an improvement for accurately centered drilling, however, appropriate practice and skill is required.

SUMMARY OF THE INVENTION

Therefore, it is the primary object of the present invention to provide a method for essentially accurate spot drilling with a hollow core drill bit in a hand held qrilling tool, so that the method can be carried out in a simple manner independent of the diameter of the bore being drilled and of the material forming the structural component to be drilled.

In accordance with the present invention, initially a guide is secured to the structural component to be drilled with the guide centered with respect to the axis of the bore. Next the drilling tool is placed in engagement with the surface of the structural component and is guided by a surface of the guide while the bore is initially drilled. The guide centers and supports the core drill bit during the commencement of the drilling operation.

With the guide projecting from the surface of the component to be drilled, the core drill bit is guided in the desired direction during spot drilling. The method can be matched to the diameter of the drill bit by appropriate selection of the diameter of the guide.

A hollow core drill bit can be guided in an accurately centered manner by means of the guide embodied in the present invention. The drilling operation need not be interrupted, since the guide does not interfere with the continuous qrilling of the bore. In addition, at the start of the drilling operation, the guide supports the weight of the drilling tool and thus relieves the operator from supporting such weight, particularly when the drilling operation is carried out at or above shoulder height or in an overhead location.

There is the evident advantage of the method embodying the present invention in that no repeated application of the drilling tool is required when drilling in an inclined manner or for replacing a special centering tool bit. Accordingly, the bore can be drilled in one continuous work step without any interruption.

Attachment of a guide can be effected, depending on the material of the structural component, by driving a fastening element, such as a nail or a threaded bolt, into the structural component. If the structural component is smooth, hard or brittle, such as tiles, an adhesive on the surface of the guide can be used which is protected until use by a covering foil. Depending on the conditions of the structural components, combinations of these guide attachment means can be used.

The guide can be provided with axially extending openings for weight reduction or to provide viewing of designations on the structural component. Such opening can also be used for the supply and removal of water and the removal of drilled material.

The guide can be formed as a disk so that a core drill bit on the drilling tool can fit over the disk. As an alternative, the guide can be formed by the head of an element driven into the structural component. In particular, when dealing with small diameter core drill bits, the head of an element can be used as the guide. Such guide elements and also fastening elements used for securing the guide in place, can be driven manually into the structural component using a hammer or a setting tool can be used for the driving operation.

If a disk or an element is used as the guide, the core remaining after the drilling step can be quickly removed without any difficulty by knocking it off, for instance, where the guide is used as an aid in directing blows against the core for removing it.

For larger diameter bores, advantageously the guide is shaped as a disk with recesses at the outer circumference for improving the drilling operation and the recesses can be used alone or together with openings through the disk for the supply of water and for the removal of water as well as of drillings or drilled material. The supply and removal of water and drillings is enhanced when the guide disk is secured in place spaced from the surface of the component, for instance, with the interposition of a washer having a diameter smaller than that of the guide disk. When using drilling tools for very large diameter bores, often a smaller diameter bit is used for forming a centering bore and subsequently the bore is drilled to its full diameter. In such instances, a guide disk with stepped diameters can be used, where the smaller diameter section engages into a previously drilled centering bore and the radially protruding diameter section is provided with adhesive for securing it to the surface of the structural component.

In another embodiment of the method the guide can be provided by a template containing an opening through which the drilling tool can be placed. Accordingly, the drilling bit is guided at its outside circumference by the template opening.

While the guide template can be secured to the structural component in the manner as described above, such as by an adhesive on the template covered initially by a protective foil, the guide template can be provided with fastening means about its outer periphery. Such fastening means can be used for connecting adjoining similarly configured templates to one another. The connection means must be arranged diametrically opposite one another. Accordingly, diametrically opposite recesses and projection are suitable as connecting means and, in a preferred embodiment, the recesses and projections can be provided with a dove-tailed shaped. With such connecting means, the guide templates can be connected together in rows on the surface of the structural component, whereby the bores can be drilled one after the other, such as bores for sockets of electrical apparatus which require a predetermined spacing from one another.

Metal, plastics material, rubber, cardboard or the like can be used as the material for the guides.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side view, partly in section, of the leading end of a drilling tool supported on a guide disk fixed to a structural component;

FIG. 2 is a plan view of another embodiment of a guide disk;

FIG. 3 is a side view, partly in section, of the guide disk of FIG. 2 taken along the line III—III and secured to a structural component;

FIG. 4 is a view similar to FIG. 1 where the guide is a template; and

FIG. 5 is a plan view of two guides such as shown in FIG. 4.

DETAILED DESCRIPTION OF THE INVENTION

In FIG. 1 a guide is in the form of a circular disk 1 secured by a fastening element or nail 2 to the surface of a structural component 3 into which a bore is to be formed. In addition, an adhesive 11 is provided on the face of the disk facing the surface of the structural component 3 for holding the disk in place along with the nail 2. The adhesive can be used in combination with the nail 2 or for positioning the disk prior to driving the nail into the structural component. Nail 2 can be driven manually by means of a hammer into the structural component or a setting tool can be used for driving the nail. Fastening element setting tools, such as used for driving the nail, can be powered by an explosive powder charge, compressed air or combustion gases.

FIG. 1 also shows the leading end of a hollow cylindrical core drill bit 4. Core drill bit 4 is formed of a carrier tube 4a with cutting elements 4b at its leading end. As can be noted from FIG. 1, the cutting elements 4b have penetrated into the structural component, but at the commencement of the drilling step the cutting elements fit around the outer circumferential periphery of the disk 1 so that the drill bit 4 is guided in a centered manner into the structural component and sideways displacement of the bit is avoided. As shown in FIG. 1, the core drill bit 4 has drilled into the structural component a sufficient distance so that the guide disk is no longer needed. The presence of the disk 1 does not interfere with the drilling operation, so that the drilling operation need not be interrupted and the disk 1 can be removed along with the drilled core after the drilling operation has been completed.

FIGS. 2 and 3 show another embodiment of the invention where the guide is again in the form of a disk 5 secured by a threaded bolt 6 to the surface of the structural component 7. Setting tools, as mentioned above can be used to drive the threaded bolt 6 into the structural component.

FIGS. 2 and 3 display how the guide disk 5 incorporates means for the supply and removal of water as well as the removal of drilled material or drillings. Such means are provided by half round recesses 8 located in the outer circumferential periphery of the guide disk 5. In addition, axially extending openings 9 through the disk spaced radially outwardly from the disk center and radially inwardly from the disk circumferential periphery afford the same purpose. An additional feature, in combination with the recesses 8 and the openings 9, is a chamfer 10 located around the circumferential periphery of the guide disk 5 on the face directed toward the structural component 7. The effect of these various means can be enhanced, if, as shown in FIG. 3, the guide disk 5 is secured to the structural component spaced from the component surface by a washer 19. Preferably, the diameter of washer 19 is selected so that it does not interfere with the recesses 8 or the openings 9.

In FIG. 4 a guide template 12 is shown fastened to the surface of a structural component 13. An adhesive 18 on the face of the template 12 fastens it to the structural component 13. The adhesive may be exposed for use by removing a protective foil. Further, in FIG. 4 a hollow cylindrically shaped core drill bit 14 is displayed. The core drill bit 14 includes an axially extending carrier tube 14a with cutter elements 14b located on the leading end of the tube. As can be seen in FIG. 4, the cutting elements 14b have penetrated into the structural component 13, but at the commencement of the drilling step, the template 12 guides the core drill bit 14 about the outer circumference of the bit. Accordingly, the guidance of the core drill bit can be provided by supporting the inner surface of the bit, as shown in FIG. 1, or by supporting its outer surface, as shown in FIG. 4. In FIG. 4 the core drill bit 14 has already drilled into the structural component for such an amount that guidance by the template 14 is no longer required.

From the plan view of the template 12 shown in FIG. 5, it can be appreciated how connecting means 15, 16, formed as dove-tailed shaped recesses and projections, are provided on the outer circumferential periphery of the template. In FIG. 5 one of the templates 12 is shown in full lines while the other template is shown in phantom. The connecting means 15, 16 permit adjoining templates 12, 12a to be interconnected, note the template 12a shown in phantom attached to the template 12 shown in full lines. Moreover, the templates 12, 12a have openings 17 spaced outwardly from the opening for the core drill bit and inwardly from the outer circumferential periphery of the template. These openings 17 can provide the same function as the openings in FIGS. 1-3, and they can also serve to received projections of a water collection ring or the like.

While specific embodiments of the invention have been shown and described in detail to illustrate the application of the inventive principles, it will be understood that the invention may be embodied otherwise without departing from such principles.

We claim:

1. A method of drilling an axially extending bore in a structural component (3, 7, 13) using a hollow cylindrically shaped core drill bit (4, 14), wherein the method comprises the steps of fixing a guide member on a surface of the structural component and centering the guide member with respect to the axis of the bore to be drilled, applying the core drill bit (4, 14) in contact with the surface of the structural component and guiding the bit on at least one circumferentially extending surface of said guide extending in the axial direction of the bore as the bit drills into the structural component, fixing the guide (1, 5) to the surface of the structural component (3, 7, 13) by an adhesive (11, 18), and covering the adhesive (11, 18) by a removable protective foil on the surface of the guide prior to applying the guide to the surface of the structural component (3, 13).

2. Method, as set forth in claim 1, wherein providing the guide with axially extending openings (9, 17) therethrough.

3. Method, as set forth in claim 1, wherein using a disk (1, 5) as the guide for the core drill bit where an inner circumferential surface of the bit is guided by the guide.

4. Method, as set forth in claim 3, wherein providing the disk (5) with recesses (8) extending radially inwardly from the outer circumferential periphery of the disk.

5. Method, as set forth in claim 1, wherein forming the guide as a template (12) with a central opening therethrough and using the circumferential periphery of the central opening for guiding the circumferential outer periphery of the core drill bit.

6. Method, as set forth in claim 5, wherein providing the template (12) with interconnecting means (15, 16) at the outer circumferential periphery thereof for interconnecting the adjoining templates (12, 12a).

* * * * *